March 10, 1959  E. C. MAKI  2,876,743
COUNTERBALANCING MEANS FOR HYDRAULICALLY OPERATED CLUTCH
Filed March 16, 1956  2 Sheets-Sheet 2

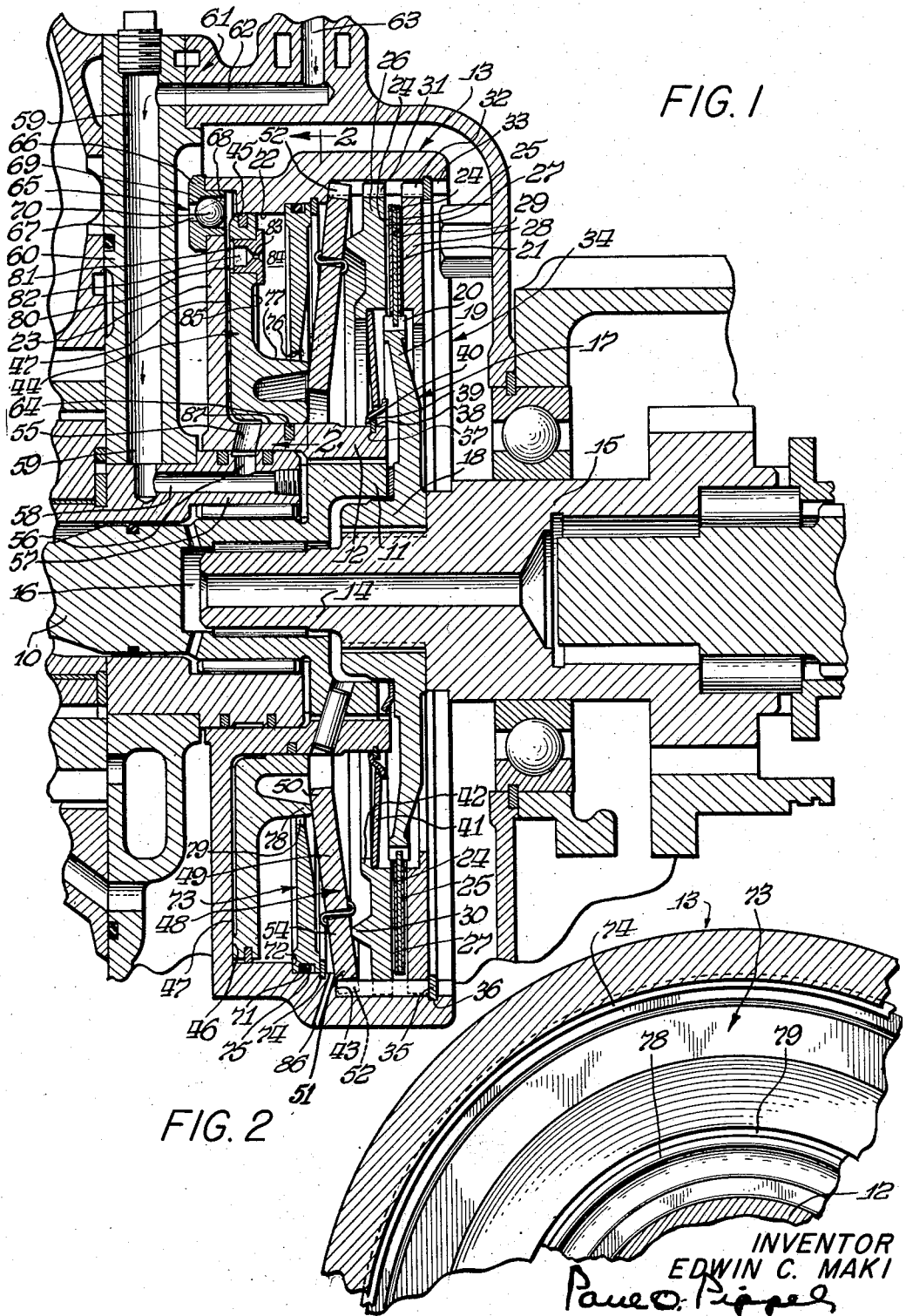

INVENTOR
EDWIN C. MAKI
ATTORNEY

United States Patent Office 2,876,743
Patented Mar. 10, 1959

2,876,743

COUNTERBALANCING MEANS FOR HYDRAULICALLY OPERATED CLUTCH

Edwin C. Maki, Fort Wayne, Ind., assignor to International Harvester Company, a corporation of New Jersey Application March 16, 1956, Serial No. 571,971

3 Claims. (Cl. 121—38)

This invention relates to gripping devices such as clutches or the like and particularly to clutches of the friction type in which relatively rotatable parts are forced together by fluid pressure to engage the clutch.

Fluid pressure energized friction clutches generally include a rotatable hydraulic cylinder, a relatively reciprocal piston within the cylinder forming one wall of a fluid receiving chamber. Fluid under pressure is admitted to the chamber to advance the piston in an axial direction against the action of clutch springs to cause frictional engagement of the clutch members. The total axial force acting on the clutch piston tending to apply the clutch is proportional to the static line pressure of the fluid admitted to the chamber as well as the dynamic centrifugal oil pressure due to the fact that the fluid within the fluid receiving chamber is being rotated. In order to allow the clutch springs to disengage the clutch members it is necessary to diminish the fluid pressure in the fluid receiving chamber. It will be appreciated that when the static line pressure is released to permit disengagement of the clutch members, a complete disengagement of the clutch friction elements is not insured if all of the fluid is not drained from the chamber, since the centrifugal force of the fluid remaining in the chamber will cause a sufficient side or axial thrust to oppose the resilient action of the clutch springs and prevent complete disengagement of the clutch members.

The problem of positively preventing self-energization of the clutch due to the development of centrifugal pressure in the body of fluid in the peripheral region of the chamber pursuant to rotation of the chamber has been studied by many and various means have been proposed for solving the problem. Heretofore such devices or means have taken the form of a valve and valve controlling means for releasing the fluid pressure by exhausting the fluid contained in the chamber upon termination of the exteriorly applied pressure to the fluid. Oftentimes because of the erratic behavior of the clutch drain or dump valve the fluid contained within the fluid receiving chamber is not quickly drained therefrom immediately upon release of the pressure within the chamber. Consequently, to guard against this contingency and to insure a quick and rapid release of the friction elements of the clutch upon cessation of the fluid pressure within the chamber much heavier clutch release springs are employed than would be necessary if it was absolutely assured that the drain or dump valve was operating perfectly and efficiently at all times.

Heretofore when designing a fluid pressure energized friction clutch it was necessary to construct the various parts, such as the hydraulic cylinder, piston, clutch release springs, etc., of a strength sufficient to withstand the maximum fluid pressure anticipated in the operation of the clutch. Obviously the maximum fluid pressure experienced by the clutch would be during the time that the clutch is in its engaged condition rotating at its predetermined maximum speed. The pressure then would be due to the static line pressure and the pressure caused by the revolving mass of fluid contained within the fluid receiving chamber. It is one of the purposes of the present invention to incorporate counterbalancing means within a fluid pressure energized friction clutch which will substantially counteract the centrifugal force of the fluid in the fluid receiving chamber. Thus the clutch actuating structure need be designed only to accommodate the forces exerted by the static line pressure within the fluid receiving chamber with the result that the various components are of a much lighter construction than heretofore possible. Furthermore, a rapid and positive release of the clutch is assured when such clutch is equipped with the counterbalancing means of the present invention even though the automatic dump or drain valve is not functioning efficiently.

It is a further object of the invention to provide a hydraulic counterbalancing means for directly compensating for the centrifugal force developed by the body of fluid in the peripheral region of the fluid receiving chamber of a hydraulically operated clutch pursuant to rotation of the chamber.

A still further object is the provision of hydraulic counterbalancing means for hydraulically operated clutch which functions in conjunction with the clutch release springs to disengage the clutch members quickly and positively upon termination of the line pressure to the fluid receiving chamber.

Still another object is to provide unique means for insuring disengagement of the clutch friction engaging elements whenever the static line pressure is released without the need of dump or drain valves.

The foregoing and other important objects and desirable features inherent in and encompassed by the invention together with many of the purposes and uses thereof will become readily apparent from a reading of the ensuing description in conjunction with the annexed drawings, in which:

Figure 1 is a side elevational view of a clutch incorporating the invention. The clutch is in its released condition and is in section to better illustrate the counterbalancing means;

Figure 2 is a view taken substantially along line 2—2 of Figure 1;

Figure 3:
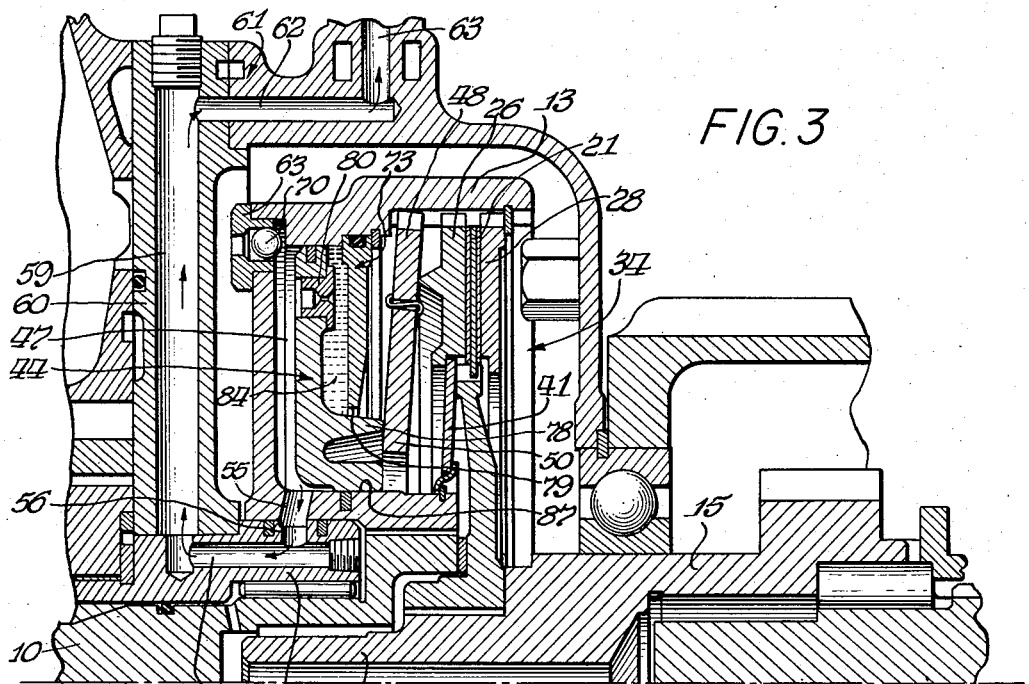
Figure 3 is a view similar to Figure 1 showing the clutch in its engaged condition.

Referring to the drawings in detail, wherein like reference characters designate like elements throughout the various views, there is shown a drive shaft 10 having an enlarged diameter end section 11 to which the hub portion 12 of a clutch drum 13 is suitably keyed for rotation together. One end 14 of the driven shaft 15 extends into an axial recess 16 provided in the drive shaft 10. Suitable roller bearings are carried within the recess 16 and thus the driven shaft 15 is partially rotatably supported by the drive shaft. The driven clutch plate 17 has a hub portion 18 which is suitably fastened to the driven shaft 15 to rotate therewith. The clutch plate 17 includes a radial flange 19 having its peripheral edge 20 castellated for non-rotatably supporting a clutch ring 21, the opposing faces of which carry annular disks 24 and 25, respectively, of suitable high friction material. From the foregoing it will be appreciated that the clutch ring 21 is free to move axially with respect to the radial flange 19 but cannot rotate relatively thereto.

A clutch pressure plate in the instant invention is in the form of a ring 26 having a flat surface 27 on one side thereof in axial alignment with the annular disks 24 and 25. A clutch plate 28 also in the form of a ring is positioned on the side of the clutch plate 17 opposite the clutch pressure plate 26 and is provided with an annular boss 29 in axial alignment with the flat surface 27 and the annular disks 24 and 25. The side of the pressure plate 26 opposite the flat surface 27 has an integrally formed, axially projecting annular ridge 30 thereon, the purpose of which will be explained hereinafter. The outer peripheral edges of the pressure plate 26 and the drive clutch plate 28 are provided with circumferentially spaced radially extending lugs 31 and 32, respectively, which are received in circumferentially spaced axially extending slots 33 formed in one end of the clutch drum 13. The clutch drum 13 encloses the disks 24, 25, the annular boss 29, and the flat surface 27 which serve as the friction-engaging surfaces of the clutch designated generally by numeral 34. From the foregoing it will be appreciated that the pressure plate 26, the drive clutch plate 28, and the clutch drum 13 are constrained to rotate together but the pressure plate 26 is capable of moving axially with respect to the clutch plate 28 and the clutch drum 13. A snap ring 35 confined in an internal groove 36 in the clutch drum 13 prevents the clutch plate 28 from being moved axially to the right, as viewed in Figure 1, with respect to the clutch drum 13.

A groove 37 is cut in the outer surface of the hub 12 adjacent one end thereof for receiving a snap ring 38. The ring 37 serves as an abutment for one leg 39 of a Z-shaped spring retainer ring 40. A plurality of radially extending leaf spring members 41 having their outer ends connected together are interposed between the pressure plate 26 and the retainer ring 40. The outer ends of the leaf spring members 41 abut an inwardly projecting lip 42 formed on the pressure plate 26 and the inner ends thereof are confined by the retainer ring 40. It will be appreciated that the leaf spring members 41 resiliently urge the pressure plate 26 to the left, as viewed in Figure 1, causing the lugs 31 to move toward the bottoms of the slots 33. In this position the clutch 34 is disengaged since the clutch ring or plate 17 is free to rotate with respect to the clutch plate 28 and the pressure plate 26. Upon the application of an axial force sufficient to overcome the resilient force of the leaf spring members 41 the pressure plate 26 moves to the right causing a frictional engagement between the clutch plate 17 and the clutch and pressure plates 28 and 26, respectively.

In order to move the pressure plate 26 against the resilient action of the leaf spring members 41 to engage the clutch 24 hydraulically, a circular plate-like piston, designated generally by numeral 44, is slidably mounted on the outer surface of the hub portion 12. The piston 44 has an oil sealing ring 45 mounted on its outer periphery which engages the interior surface 22 of the clutch drum 13. The circular end wall 23 of the clutch drum 13 is provided with an axially extending annular ridge 46 adjacent its periphery which is engaged by the piston 44 when the clutch 34 is fully disengaged as shown in Figure 1 to axially space the piston from the wall and allow an annular space 47 for receiving fluid under pressure.

The force of the piston 44 as it moves to the right, as viewed in Figure 1, is transmitted to the pressure plate 26 by means of a spring device 48 which also functions as a force multiplying lever unit. The spring device 48 includes a plurality of circumferentially spaced radially extending spring fingers 49 which have their inner ends 50 engaging an axially extending annular ridge 78 integrally formed with the piston 44. The outer ends 51 of the fingers 49 which are all suitably joined together are castellated to provide lugs 52 which are received in the circumferentially spaced axially extending slots 33 formed in the clutch drum 13 and are adapted to abut the bottom walls 43 of the slots. The annular ridge 30 formed on the pressure plate 26 is adapted to abut an intermediate portion 54 of each of the fingers 49. It will be noted that the intermediate portions 54 are radially spaced closer to the outer ends 51 than the inner ends 50 whereby the application of a given force on the inner ends 50 of the fingers 49 causing the fingers in effect to pivot about their outer ends 51 results in the transmission of a greater force to the pressure plate 26. The fingers 49 also resiliently urge the piston 44 to the left against the wall 23.

Fluid under pressures from an external source is introduced into the annular space 47 between the piston 44 and the wall 23 by means of a radial bore 55 in the clutch drum hub 12 which communicates with a groove and radial bore 56 formed in a sleeve-like bearing retainer 57. Extending axially through the bearing retainer 57 is a passageway 58 which has one end in liquid communication with the radial bore 56 and its opposite end in liquid communication with a radial bore 59 partially formed in the bearing retainer and the end wall 60 of a stationary housing 61 enclosing the entire clutch 34. The housing 61 provides a fluid tight casing for the clutch 34. The bore 59 leads to an axially extending bore 62 formed in housing 61 which, in turn, is in fluid communication with a radially extending passageway 63. A conduit, not shown, is suitably fastened to the housing 61 and provides fluid communication between an external source such as a pump or the like, not shown, and the passageway 63. A valve (not shown) is interposed in the conduit and is adapted to direct fluid such as oil from the pump to passageway 63 in one condition and to place the passageway 63 in fluid communication with the fluid reservoir (not shown) of the pump in a second condition. Suitable oil sealing rings 64, shown somewhat diagrammatically in Figure 1, are interposed between the piston 44 and the hub 12 of the clutch drum 13, and the bearing retainer 57 and the hub portion 12 of the clutch drum 13 to prevent oil leakage.

In operation, fluid under pressure is supplied to the annular space or chamber 47 through the liquid conduit means described above from an external source. The pressure of the fluid on the piston 44 causes it to move to the right, as viewed in Figure 1, against the combined resilient action of the fingers 49 and the spring members 41. The force developed by the fluid pressure acting on the piston 44 is supplied to the inner ends 50 of the fingers 49 resulting in a much larger force being applied to the pressure plate 26 to move the clutch plate 28 and the clutch ring 21 into frictional engagement. Upon release of the external fluid pressure as when the aforementioned valve is conditioned to establish fluid communication between the passageway 63 and the fluid reservoir, it reverses its axial movement and the pressure plate 26 is returned to the position shown in Figure 1 by virtue of the leaf spring members 41, thereby disengaging the clutch ring 21 and the clutch plate 28. Immediately upon disruption of the fluid flow from the pump, the fluid within the chamber 47 and the fluid conduit means extending between the chamber and the fluid reservoir tends to drain to the fluid reservoir. In prior devices the spring members, being tensioned when the clutch is engaged, supply the only force tending to release the friction engaging elements of the clutch and return the piston to the bottom of the cylinder by forcing fluid from the chamber to the fluid reservoir.

Because of the various inherent physical characteristics of flowing fluids and the somewhat restricted passageways in which the fluid is flowing, a certain time delay is experienced before the fluid receiving chambers of actual hydraulically actuated clutches is drained. Consequently, the clutch releasing operation is not rapid and positive as desired. Furthermore, inasmuch as the clutch 34 described above is generally rotating at relatively high speeds during the operation of the same, it is evident that high axially directed pressures are developed in the annular chamber 47 in the vicinity of the outer periphery thereof by the centrifugal force of the fluid contained in the annular chamber at any time. It is well known that the resulting axial thrust increases as the square of the R. P. M. and as the fourth power of the diameter of the chamber and is directly proportional to the mass of the fluid. Thus, fluid clutch designers in an attempt to insure a rapid and complete disengagement of the clutch elements without the need of employing extremely large clutch springs have generally resorted to the use of additional valve means for automatically draining the fluid from the annular chamber 47 immediately upon a release of the external pressure on the fluid. One such automatic valve means is shown in Figures 1 and 3. The valve means, designated generally by numeral 65, includes a plug 66 press-fit into an axially extending opening in the end wall 23 of the clutch drum 13 adjacent the outer periphery thereof. The plug 66 is provided with a central bore 67 and a bore 68 coaxial with and of much greater diameter than the bore 67. The bores 67 and 68 are joined by a tapered annular shoulder 69. Fluid flow through the bores 67 and 68 is controlled by a metal ball 70, which has a diameter less than the diameter of the bore 68 but greater than the bore 67. The valve means 65 is designed such that whenever the fluid within the space 47 is subjected to line pressure as when the pressure side of the aforementioned pump is in fluid communication with the chamber 47, the ball 70 is caused to seat itself on the annular shoulder 69 to prevent the flow of fluid from the bore 68 to the bore 67 which is in communication with the interior of the stationary fluid-tight housing 61. However, when the pressure in the chamber 47 is released, as when the passageway 63 is placed in fluid communication with the fluid reservoir which is formed by the bottom portion of the housing 61, and consequently the force of the fluid acting on the ball 70 tending to seat the same upon the annular shoulder 69 is diminished, the ball is adapted to roll off the annular shoulder 69, as shown in Figure 3, to allow fluid to flow through the bore 68 to the bore 67 and to the oil sump or fluid reservoir.

Assuming that it is desired to couple the drive shaft 10 to the driven shaft 15, fluid under pressure from an external source is introduced into the annular chamber 47 of sufficient magnitude to move the piston 44 axially to engage the clutch plate and ring 28 and 21, respectively. The pressure of the fluid, due to the external pressure source, is equally distributed over the face of the piston 44 and is also applied to the ball 70 causing it to assume a position on the annular shoulder 69 to close the exhaust bore 67. In addition to the axial force applied to the piston 44 derived from the line pressure of the fluid, the piston face is also subjected to the pressure developed by the centrifugal force of any fluid within the chamber 47. As stated hereinbefore, the pressure developed by the centrifugal force of the fluid within the chamber 47 in any given fluid clutch structure varies as the square of the R. P. M. It will thus be appreciated that the various clutch parts, such as the piston 44 and clutch drum portion acting as a cylinder therefor, spring members 41 and spring device 48, must be constructed of such a size and strength to withstand the maximum fluid line pressure as well as the pressure developed by the centrifugal force of the fluid within the chamber 47 when the chamber 47 is being rotated at its maximum designed speed. Thus if the valve means 65 fails to function properly whereby the ball 70 does not completely roll off the annular shoulder 69, or the bore 67 is somewhat restricted by dirt or other foreign elements contained in the fluid, the fluid in the chamber 47 is not quickly exhausted therefrom upon release of the external pressure on the fluid. Consequently centrifugal force acting on the residual fluid in the chamber 47 produced an axial force opposing the action of the clutch spring members 41 and the spring device 48. Hence, in prior devices it was necessary to construct the spring device 48 and the spring members 41 with relatively high bias characteristics to counteract the axial force due to centrifugal force acting on the fluid remaining in the chamber 47 in order to insure rapid disengagement of the clutch friction engaging parts upon release of the fluid line pressure. It will also be appreciated that in prior devices of the type to which this invention relates, when the valve means was functioning properly and the fluid line pressure was released, the fluid-receiving chamber or space 47 would be completely empty of fluid. Thus, when engaging the friction elements of the clutch by admitting fluid under pressure to the fluid-receiving chamber 47, it was necessary to again fill the chamber with fluid before an axial clutch engaging force could be applied to the piston 44 which obviously increased the operation time necessary to engage the friction clutch elements.

The present invention contemplates the substantial elimination of the various shortcomings of prior fluid pressure actuated friction clutch devices enumerated above. An annular interior surface section 71 adjacent the interior surface 22 of the clutch drum 13 has a diameter greater than the diameter of the interior surface 22 to provide a shoulder 72. The section 71 and the shoulder 72 form a seat for receiving the peripheral edge of a circular baffle plate 73. The baffle plate 73 extends radially and is positioned between the piston 44 and the spring device 48. A snap ring 74 is used to maintain the baffle plate 73 secured to the clutch drum 13. Suitable oil sealing means designated generally by numeral 75 are interposed between the clutch drum and the outer peripheral edge of the baffle plate 73 to prevent oil leakage therebetween. The baffle plate 73 is provided with a central opening defined by a circular edge 76. The edge 76 is radially spaced from the outer surface 77 of the axially extending ridge 78 in all positions of the piston 44. Thus, an annular slot 79 is formed, the purpose of which will be explained hereinafter.

A plug 80 is press-fit into an axially extending opening 81 in the piston 44 adjacent the outer peripheral edge thereof. The plug 80 is provided with a central relatively large bore 82 in fluid communication with the fluid-receiving chamber 47 and a restricted passageway 83. The restricted passageway is also fluid communication with a fluid-receiving counterbalancing chamber 84 defined by the interior surface 22 of the clutch drum, the baffle plate 73, the outer surface 77 of the annular ridge 78 and the surface 85 of the piston 44. The annular slot 79 provides means for permitting fluid to flow from the counterbalancing chamber 84 and return to the fluid reservoir or oil sump by flowing through drain passageways 86, one of which is shown in Figure 1, formed in the clutch drum 13.

Assuming that it is desired to couple the drive shaft 10 to the driven shaft 15, the structure shown in Figures 1, 2 and 3 operates as follows: The line valve is conditioned such that fluid under pressure from the pump is introduced into the passageway 63 where it flows through the conduit means described above to the annular fluid-receiving chamber 47. The fluid introduced into the annular chamber 47 is of sufficient magnitude to move the piston 44 axially to cause frictional engagement of the clutch plate and ring 17 and 28, respectively. The static pressure of the fluid is equally distributed over the face of the piston 44 and inasmuch as the clutch drum 14 is rotating, additional fluid pressure is developed by the centrifugal force acting on the fluid within the chamber 47 which is greatest in the zone adjacent the outer periphery of the chamber. The static line pressure in the chamber 47 is also impressed upon the ball 70 causing it to roll and seat itself upon the annular shoulder 69 to thus disestablish fluid communication between the chamber 47 and the fluid reservoir. It is to be understood that because of the relatively high magnitude of the static line pressure in relation to the pressure developed by centrifugal force at all rotational speeds of the drive shaft 10, the ball 70 is positioned on the shoulder 69 whenever external line pressure is present in the chamber 47 and is in a position wherein the passage 67 is uncovered when the external pressure is released even though the clutch drum 13 is rotating at its maximum speed. Thus if the valve and valve control means 65 is functioning properly, immediately upon release of the external pressure on the fluid by conditioning the line valve so that the passageway 63 is in fluid communication with the fluid reservoir the only fluid pressure remaining in the chamber 47 is due to the centrifugal force of the chamber-contained fluid which is, as stated above, greatest in the vicinity of the dump valve 65 and since the passageways 68 and 67 are in fluid communication with each other, the fluid contained in the chamber 47 is allowed to flow to the fluid reservoir. However, oftentimes because of malfunctioning of the valve means 65 the fluid contained within the chamber 47 is not drained as quickly as desired upon release of the external line pressure. If such is the case, the centrifugal force acting on the residual fluid causes an axial force opposing the releasing action of the spring device 48 and the spring members 41 resulting in an impositive and relatively slow clutch disengaging operation as distinguished from a positive and rapid clutch disengagement operation which is usually desired.

In applicant's device whenever fluid under pressure is present in the chamber 47 it flows through the restricted passageway 83 and fills the counterbalancing chamber 84. Obviously the fluid within the counterbalancing chamber 84 is not subjected to the external pressure developed by the pump but is subjected to centrifugal force when the clutch drum 13 is rotating. As stated hereinbefore, the centrifugal force of fluid contained in a rotating chamber develops axially directed pressures. The resulting axial thrust increases as a square of the R. P. M. and as the fourth power of the diameter of the chamber and is directly proportional to the mass of fluid within the chamber. Thus the axial thrust due to centrifugal pressure in the fluid-receiving counterbalancing chamber 84 acting upon the piston 44 is in opposition to the axial thrust developed by the centrifugal pressure in the chamber 47 and since both chambers are rotating at the same R. P. M. at all times and the interior wall surface 22 of the clutch drum 13 defines the outer diameter of both chambers any difference in magnitude between the axial thrust forces developed in each chamber is due to difference in the mass of fluid within each chamber. The maximum mass of fluid possible in the counterbalancing chamber 84 is controlled by the position of the annular discharge slot 79 with respect to the rotational axis of the clutch drum 13. It will be appreciated that while the axial thrust tending to move the piston 44 to the left as viewed in Figure 1 due to the centrifugal pressure of the fluid within the counterbalancing chamber 84 can never exceed the value of the axial thrust due to the centrifugal pressure of the fluid in the chamber 47 when completely filled (because the inner wall of the chamber 47 is defined by the outer annular surface 87 of the clutch drum inner sleeve or hub sleeve 12 which is spaced radially inwardly of the corresponding inner wall 77 of the counterbalancing chamber 84) the axial thrust approaches such value. Once the clutch pressure plate 26 and clutch plate 28 are initially forced into frictional engagement with clutch ring 21 during operation of the clutch the counterbalancing chamber 84 begins to fill with fluid. If the clutch is in its engaged condition any length of time the chamber 84 becomes completely filled and any surplus fluid admitted to the chamber then drains through the slot 79 to the fluid reservoir. The axial force resulting from the centrifugal pressure of the fluid in the chamber 47 is substantially counterbalanced by the axial thrust developed by the centrifugal pressure of the fluid in the counterbalancing chamber 84 when the counterbalancing chamber 84 is filled and hence the resultant axial force tending to maintain the clutch in its engaged condition is due almost entirely to the external pressure acting upon the piston 44. Upon release of the external pressure, the axial force resulting from the centrifugal pressure of the fluid within the counterbalancing chamber 84 augments the bias action of the spring members 41 to move the piston 44 to the left, as viewed in Figure 3. Hence if the valve means 65 malfunctions and the fluid in chamber 47 is not quickly exhausted therefrom the axial force resulting from the fluid pressure in the counterbalancing chamber 84 compensates for the axial thrust due to the centrifugal pressure of the residual fluid in the chamber 47 or stated in another way the resultant axial force of the spring members 41, the spring device 48, and the centrifugal pressure in the counterbalancing chamber 84 urge the piston 44 to the left causing the fluid within the chamber 47 to be forced through the conduit means leading to the reservoir from the chamber 47. It will be appreciated that once the chamber 84 is supplied with fluid thereafter, during operation of the clutch, engagement and disengagement thereof is relatively rapid even though the valve means 65 is functioning improperly. Hence since the pressure within the chamber 47 due to the centrifugal force acting upon the fluid therein is substantially counterbalanced during the operation of the clutch, a clutch structure having much lighter constructed clutch actuating parts is permitted than heretofore possible and at the same time rapid and positive disengagement of the clutch is insured.

Figure 4:
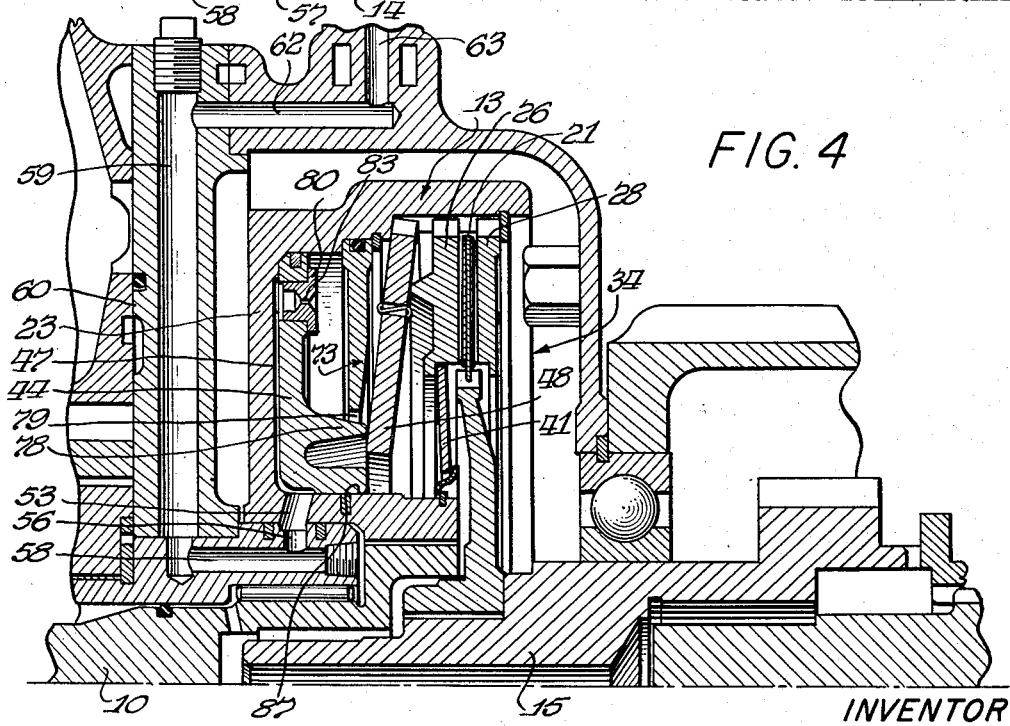
Figure 4 is a longitudinal sectional view of a clutch structure embodying the invention and wherein the clutch dump or drain valve is eliminated.

The invention has been described in combination with a clutch actuating structure employing a dump or automatic drain valve 65. The invention also has utility in clutch actuating structures which do not utilize automatic dump valves. In Figure 4 a clutch structure is shown similar to that shown in Figures 1, 2 and 3 and described above. However, it will be noted that the dump valve 65 has been eliminated therefrom. In the operation of the clutch structure shown in Figure 4, in order to release the pressure in the chamber 47 to disengage the clutch, the line valve is conditioned to disestablish fluid communication between the pump and the passageway 63 and establish fluid communication between the passageway 63 and the fluid reservoir. Thus the fluid in chamber 47 can only drain back to the fluid reservoir through the conduit means leading from the chamber 47 including passageway 63 to the fluid reservoir. The axial force resulting from the centrifugal pressure of the fluid within the chamber 84 acts in conjunction with the biasing forces of the spring device 48 and spring members 41 to force the fluid within the chamber 47 to flow through the conduit means leading to the fluid reservoir by urging the piston 44 to the left, as viewed in Figure 4.

Inasmuch as the face of the piston 44 is spaced from the end wall 23 of the clutch drum 13 when the piston 44 is in its contracted position by means of the annular boss 46, the chamber 47 is filled with fluid. This is true because the clutch drum 13 is rotating and the fluid contained in the chamber 47 tends to move radially outwardly from the passageway 55 which is located in the radially innermost area of the chamber 47. If the fluid in the chamber 47 should diminish to a point where the centrifugal pressure exerted thereby upon the piston 44 is less than the centrifugal pressure exerted by the fluid within the counterbalancing chamber 84 fluid will flow from the chamber 84 to the chamber 47 through the restricted passageway 83 in order to balance centrifugal pressure on each side of the piston 44. When the line valve is then again conditioned to direct fluid under pressure to the chamber 47 in order to engage the clutch it will be evident that inasmuch as the chamber 47 is completely filled or substantially filled with fluid the time necessary to fill the chamber 47 with fluid is practically negligible and the clutch engaging operation is, thus, very rapid.

The embodiments of the invention chosen for the purposes of illustration and description herein are those preferred as a result of selected tests based upon the requirements for achieving objects of the invention and developing the utility thereof in a most desirable manner, due regard being had to existing factors of economy, simplicity of design and construction, production methods and the improvements sought to be effected. It will be appreciated, therefore, that particular structural and functional aspects emphasized herein are not intended to exclude but rather to suggest such other adaptations and modifications of the invention as fall within the spirit and scope of the invention as defined in the appended claims.

What is claimed is:

1. In a hydraulic system; the combination comprising: a rotatable fluid-receiving chamber having a movable circular wall, said wall being movable in a particular direction upon increase in fluid pressure in said chamber; and counterbalancing means for applying a variable force on said wall opposing movement of said wall in said particular direction, the magnitude of said force being proportional to the portion of the magnitude of the fluid pressure in said chamber incurred by centrifugal force upon the fluid pursuant to rotation of said chamber, said means including a second chamber rotatable in unison with and coaxial with respect to said first-mentioned chamber, said wall forming one wall of said second chamber, an axially extending passageway through said wall adjacent the outer periphery thereof for providing fluid communication between said chambers.

2. In a hydraulic system substantially as set forth in claim 1, in which, a stationary housing is provided for enclosing said chambers, and annular fluid discharge means are provided radially spaced inwardly of said passageway for provided fluid communication between said second chamber and the interior of said housing.

3. In a hydraulic system; the combination comprising: a stationary housing; a rotatable cylindrical drum enclosed by said housing having one end thereof closed by a wall, an axially slidable circular piston mounted in said drum for rotation therewith, said wall and piston defining wall portions of a fluid-receiving chamber and said piston being movable axially away from said wall upon increase in fluid pressure in said chamber, said piston being provided with an integral annular ridge projecting in a direction axially away from said wall adjacent its center; yieldable means opposing movement of said piston axially away from said wall, said yieldable means frictionally engaging said annular ridge; and counterbalancing means for applying a variable force on said piston opposing sliding movement thereof away from said wall including a second chamber, a radially extending plate secured to said drum and axially spaced from said drum end wall, said piston and plate defining wall portions of said second chamber, said plate having a central circular opening, the marginal edge of said plate defining said opening being radially spaced from said annular ridge to provide an annular opening, said opening providing fluid communication between said second chamber and the interior of said housing, and a restricted passageway extending axially through said piston adjacent the outer periphery thereof for providing fluid communication between said chambers.

References Cited in the file of this patent

UNITED STATES PATENTS

| | | |
|---|---|---|
| 2,328,090 | Nutt | Aug. 31, 1943 |
| 2,328,091 | Nutt | Aug. 31, 1943 |
| 2,720,298 | Youngren | Oct. 11, 1955 |
| 2,740,512 | Fischer | Apr. 3, 1956 |

FOREIGN PATENTS

| | | |
|---|---|---|
| 564,638 | Great Britain | Oct. 6, 1944 |